US009306260B2

(12) United States Patent
Shimasaki

(10) Patent No.: US 9,306,260 B2
(45) **Date of Patent: *Apr. 5, 2016**

(54) COUPLER AND ELECTRONIC APPARATUS

(71) Applicant: Kabushiki Kaisha Toshiba, Minato-ku, Tokyo (JP)

(72) Inventor: Hiroshi Shimasaki, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,618

(22) Filed: Jun. 26, 2014

(65) Prior Publication Data

US 2014/0306783 A1 Oct. 16, 2014

Related U.S. Application Data

(63) Continuation of application No. 13/161,353, filed on Jun. 15, 2011, now Pat. No. 8,798,556.

(30) Foreign Application Priority Data

Dec. 10, 2010 (JP) ................................ 2010-275718

(51) Int. Cl.
*H04B 1/18* (2006.01)
*H01P 5/00* (2006.01)
(Continued)

(52) U.S. Cl.
CPC ................ *H01P 5/00* (2013.01); *H01Q 1/2266* (2013.01); *H01Q 1/2275* (2013.01); *H01Q 5/371* (2015.01); *H01Q 9/42* (2013.01)

(58) Field of Classification Search
CPC ...... H04B 5/0081; H04B 5/0031; H04B 5/00; H04B 5/02; H04B 5/0037; H04B 5/0062; H04B 5/0075; H04B 5/0056; H04B 1/0057; H04B 5/0012; H04B 5/0068; H04B 1/1607; H04B 5/0018; H04B 5/0025
See application file for complete search history.

(56) References Cited

U.S. PATENT DOCUMENTS

| | | | |
|---|---|---|---|
| 4,040,060 | A | 8/1977 | Kaloi |
| 2002/0044099 | A1 | 4/2002 | Yamamoto et al. |

(Continued)

FOREIGN PATENT DOCUMENTS

| | | | |
|---|---|---|---|
| JP | 08-186425 | A | 7/1996 |
| JP | 09-167214 | A | 6/1997 |

(Continued)

OTHER PUBLICATIONS

Japanese Office Action dated Feb. 7, 2012 for Japanese Application No. 2010-275718 filed Dec. 10, 2010.

(Continued)

*Primary Examiner* — Edward Urban
*Assistant Examiner* — Mohammed Rachedine
(74) *Attorney, Agent, or Firm* — Knobbe, Martens Olson & Bear LLP

(57) ABSTRACT

According to one embodiment, a coupler for transmitting and receiving electromagnetic wave by electromagnetic coupling between the coupler and another, includes a line-shaped coupling element including a first open end and a second open end, a ground plane, a feeding element connecting the coupling element and a feed point, and a short circuiting element connecting the feeding element and the ground plane. The feeding element includes a first end connected to an intermediate portion between the first open end and the second open end of the coupling element, and a second end connected to the feed point. The short circuiting element includes a third end arranged between the first end of the feeding element and the second end of the feeding element, and a fourth end connected to the ground plane.

15 Claims, 13 Drawing Sheets

(51) Int. Cl.

| | |
|---|---|
| ***H01Q 1/22*** | (2006.01) |
| ***H01Q 9/42*** | (2006.01) |
| ***H01Q 5/371*** | (2015.01) |

(56) References Cited

U.S. PATENT DOCUMENTS

| | | | | |
|---|---|---|---|---|
| 2004/0027288 | A1* | 2/2004 | Okubora ................ | H01Q 1/243<br>343/700 MS |
| 2005/0094376 | A1* | 5/2005 | Montoya .................. | H01Q 1/02<br>361/704 |
| 2005/0156755 | A1* | 7/2005 | Miller ..................... | H01L 23/48<br>340/854.6 |
| 2005/0174297 | A1* | 8/2005 | Cake ........................ | H01Q 1/38<br>343/834 |
| 2006/0189345 | A1 | 8/2006 | Suzuki et al. | |
| 2009/0009401 | A1 | 1/2009 | Suzuki et al. | |
| 2010/0321906 | A1 | 12/2010 | Nakano | |
| 2012/0270501 | A1 | 10/2012 | Borisov et al. | |
| 2013/0040564 | A1* | 2/2013 | Tsirline .............. | G06K 17/0009<br>455/41.1 |

FOREIGN PATENT DOCUMENTS

| | | | | |
|---|---|---|---|---|
| JP | 10-340142 | A | | 12/1998 |
| JP | 10340142 | A | * | 12/1998 |
| JP | 2001050823 | A | * | 2/2001 |
| JP | 2002-050923 | A | | 2/2002 |
| JP | 2004-048471 | A | | 2/2004 |
| JP | 2004048471 | A | * | 2/2004 |
| JP | 2004-072562 | A | | 3/2004 |
| JP | 2004072562 | A | * | 3/2004 |
| JP | 2004-207992 | A | | 7/2004 |
| JP | 2004207992 | A | * | 7/2004 |
| JP | 2006-109358 | A | | 4/2006 |
| JP | 2006-229730 | A | | 8/2006 |
| JP | 2009-033742 | A | | 2/2009 |
| JP | 2009-100453 | A | | 5/2009 |
| JP | 2010-130535 | A | | 6/2010 |
| JP | 2010-157872 | A | | 7/2010 |

OTHER PUBLICATIONS

Japanese Office Action dated Sep. 27, 2011 for Japanese Application No. 2010-275718 filed Dec. 10, 2010.

Watanabe et al., Characteristics of the SAR Distribution in a Head Exposed to Electromagnetic Fields Radiated by a Hand-Held Portable Radio, IEEE Transactions on Microwave Theory and Techniques, vol. 44, No. 10, Oct. 1996, pp. 1874-1883.

* cited by examiner

COUPLER AND ELECTRONIC APPARATUS

CROSS-REFERENCE TO RELATED APPLICATIONS

This application is a continuation of U.S. patent application Ser. No. 13/161,353, filed on Jun. 15, 2011 which is based upon and claims the benefit of priority from Japanese Patent Application No. 2010-275718, filed Dec. 10, 2010, the entire contents of each of which are incorporated herein by reference.

FIELD

Embodiments described herein relate generally to a coupler to transmit and receive an electromagnetic wave, for example, a coupler and an electronic apparatus used for close proximity wireless transfer.

BACKGROUND

In recent years, development of close proximity wireless transfer technology is accelerated. Close proximity wireless transfer technology enables communication between two devices in close proximity. Each device having a close proximity wireless transfer function includes a coupler. If two devices are brought closer within a transfer range, couplers of the two devices are electromagnetically coupled. These devices can wirelessly transmit and receive a signal to and from each other.

A typical coupler includes, for example, a coupling element, an electrode pole, a resonant stub, a ground plane, and the like. A signal is supplied to the coupling element via the resonance stub and electrode pole. As a result, an electric current flows in the coupling element and an electromagnetic field is generated around the coupler. This electromagnetic field enables an electromagnetic coupling between the couplers of the two devices brought closer to each other. Another example of the typical coupler is an inverted-F antenna.

Incidentally, in the coupler, a sufficient tolerance for position shifts between the coupler and a partner coupler is required. This is because wireless transfer between devices should not be affected even if the positional relationship between the devices in close proximity is slightly shifted.

Further, a coupler contained in a device is required to have high impedance. This is because if the coupler is mounted in the device, coupling arises between the coupler and peripheral components in the device, reducing the input impedance of the coupler. The reduced input impedance could lead to a degraded electromagnetic radiation efficiency of the coupler.

Still further, in recent years, a lower height of a coupler is requested so that the coupler can be mounted in various devices.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a coupler for transmitting and receiving electromagnetic wave by electromagnetic coupling between the coupler and another, comprises a line-shaped coupling element including a first open end and a second open end, a ground plane, a feeding element connecting the coupling element and a feed point, and a short circuiting element connecting the feeding element and the ground plane. The feeding element includes a first end connected to an intermediate portion between the first open end and the second open end of the coupling element, and a second end connected to the feed point. The short circuiting element includes a third end arranged between the first end of the feeding element and the second end of the feeding element, and a fourth end connected to the ground plane.

First, the configuration of the coupler 1 according to an embodiment will be described with reference to FIG. 1. The coupler 1 transmits and receives electromagnetic waves by electromagnetic coupling between the coupler 1 and another coupler. The coupler 1 is used for close proximity wireless transfer. The close proximity wireless transfer executes data transfer between devices in close proximity. As a close proximity wireless transfer method, for example, TransferJet™ may be used. TransferJet™ is a close proximity wireless transfer method using UWB (Ultra Wide Band). If two devices are brought closer within a transfer range (for example, 3 cm), couplers of these devices are electromagnetically coupled, thereby enabling these devices to wirelessly transmit and receive signals to and from each other.

Figure 1:
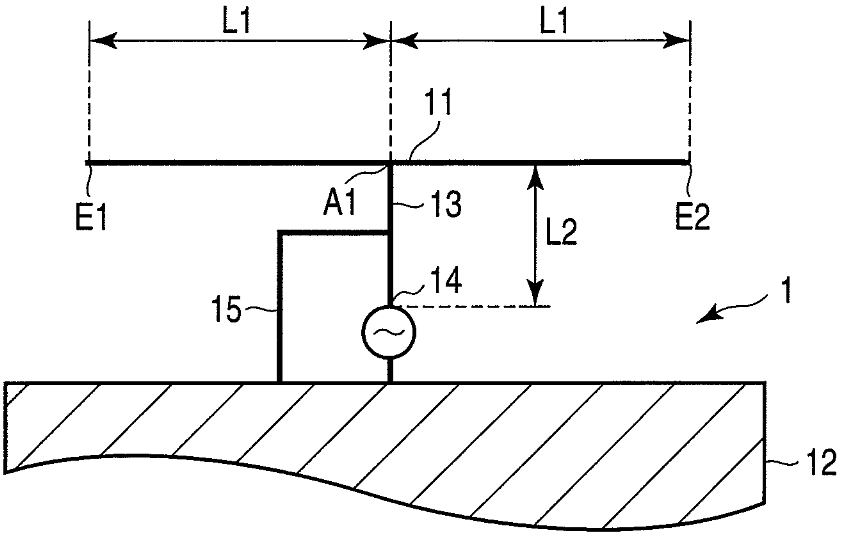
FIG. 1 is an exemplary view illustrating a configuration example of a coupler according to an embodiment.

As shown in FIG. 1, the coupler 1 comprises a coupling element 11, a ground plane 12, a feeding element 13, a feed point 14, and a short circuiting element 15. The ground plane 12 has a plate shape. The coupling element 11, the feeding element 13, and the short circuiting element 15 are all line-shaped.

The coupling element 11 is an elongate element and has a first open end E1 and a second open end E2. The first open end E1 is one end of the coupling element 11 and nothing is connected thereto. The second open end E2 is the other end of the coupling element 11 and nothing is connected thereto. The coupling element 11 is used for electromagnetic coupling of the coupler 1 to another coupler.

The feeding element 13 connects the feed point 14 and the coupling element 11. One end of the feeding element 13 is connected to an intermediate portion A1 between the first open end E1 and the second open end E2 of the coupling element 11. The other end of the feeding element 13, on the other hand, is connected to the feed point 14. The intermediate portion A1 of the coupling element 11 is positioned in an intermediate point of the coupling element 11 in the direction of the length thereof or near the intermediate point.

Figure 2:
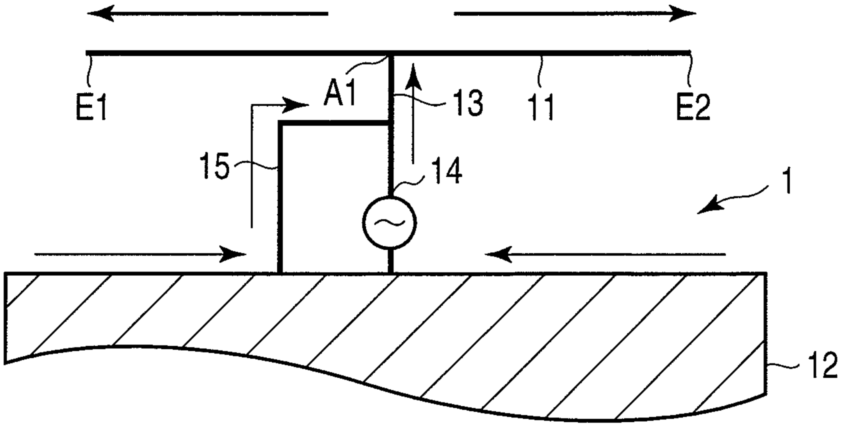
FIG. 2 is an exemplary view illustrating the orientation of a current flowing through the coupler according to the embodiment.

FIG. 2 shows a current flowing through the coupler 1. Each arrow in FIG. 2 shows the orientation of the current. In the present embodiment, as described above, the feed point 14 is coupled to the intermediate portion A1 of the coupling element 11 via the feeding element 13. Thus, currents in mutually opposite directions flow in the coupling element 11. More specifically, a current from the intermediate portion A1 toward the first open end E1 and a current from the intermediate portion A1 toward the second open end E2 flow in the coupling element 11. Moreover, strengths of these currents (amount of current) are the same. Therefore, the current distribution in the coupling element 11 is substantially symmetric with respect to the intermediate portion A1.

The degree of coupling strength between couplers depends on the direction of the current flowing in each of two couplers opposite to each other. The degree of coupling strength between couplers tends to be stronger when directions of these currents are in mutually opposite directions than when directions of these currents are the same. In the present embodiment, currents of the same amount of current and in mutually opposite directions can be passed through the coupling element 11. Therefore, the tolerance for position shifts between couplers can be increased.

As shown in FIG. 1, the short circuiting element 15 is connected (shorted) between the coupling element 11 and the ground plane 12 to increase the impedance (input impedance) of the coupler 1. In the present embodiment, the short circuiting element 15 does not connect the coupling element 11 and the ground plane 12 directly, but connects the feeding element 13 and the ground plane 12. More specifically, one end of the short circuiting element 15 is arranged (connected) between one end and the other end of the feeding element 13 and further, the other end of the short circuiting element 15 is connected to the ground plane 12.

If the coupling element 11 and the ground plane 12 are directly connected, a high impedance of the coupler 1 can be realized, but the current distribution in the coupling element 11 is no longer symmetric with respect to the intermediate portion A1. Assume a case when an intermediate position which is located between the intermediate portion A1 and the first open end E1 is connected to the ground plane 12 by a shortening element. In this case, the strength of the current from the intermediate position between the intermediate portion A1 and the first open end E1 toward the first open end E1 becomes weaker than the strength of the current from the intermediate position between the intermediate portion A1 and the first open end E1 toward the second open end E2. If the first open end E1 is connected to the ground plane 12 by a shortening element, only a current toward the second open end E2 flows in the coupling element 11 and, as a result, the tolerance for position shifts decreases.

In the present embodiment, the short circuiting element 15 connects the feeding element 13 and the ground plane 12 and thus, a high impedance of the coupler 1 can be realized without preventing currents of the same amount of current and in mutually opposite directions from being passed through the coupling element 11, that is, without weakening the tolerance for position shifts of the coupler 1.

The electric length from the feed point 14 to each of the first open end E1 and the second open end E2 is ¼ of the wavelength λ corresponding to the center frequency of electromagnetic waves (high-frequency signal) transmitted and received by the coupler 1. The electric length corresponds to the length of a current path from the feed point 14 to an open end. If ½ of the length of the coupling element 11 in the direction of the length thereof is L1 and the length of the feeding element 13 is L2, L1+L2 is equal to $\lambda/4$. Accordingly, a portion (portion from the intermediate portion A1 to the first open end E1) of the coupling element 11 and the feeding element 13 function as one resonant antenna and further, another portion (portion from the intermediate portion A1 to the second open end E2) of the coupling element 11 and the feeding element 13 function as another resonant antenna. Thus, radio signals of the desired frequency can be transmitted and received without providing a resonance stub or the like.

Figure 3:
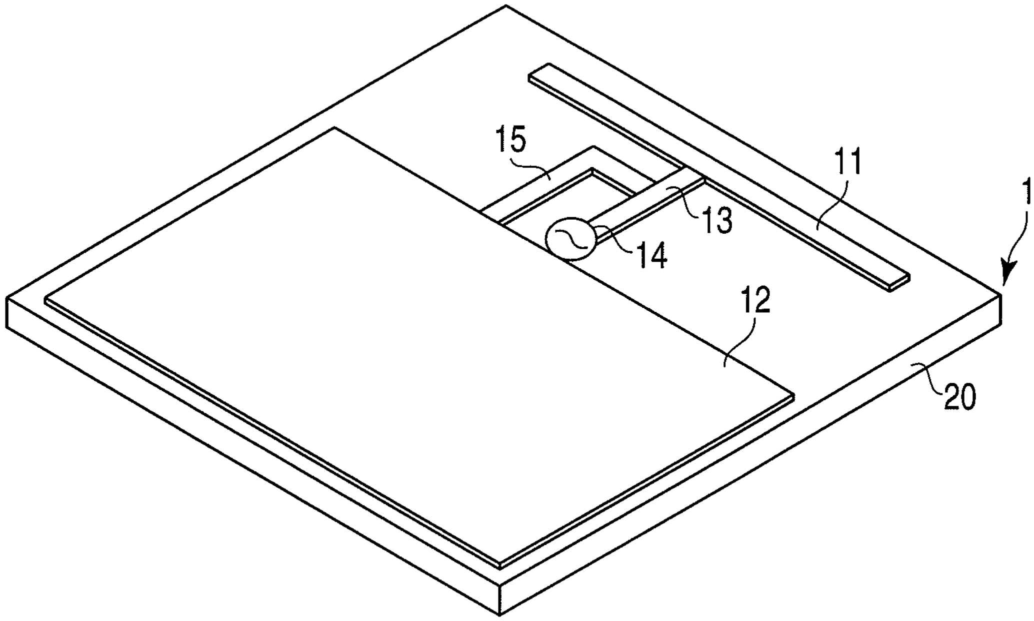
FIG. 3 is an exemplary perspective view illustrating an example of a mounting structure of the coupler according to the embodiment.

FIG. 3 shows a configuration example of the coupler 1. The coupler structure shown in FIG. 3 corresponds to a planar coupler. The coupler 1 comprises a substrate (dielectric substrate) 20. The coupling element 11, the ground plane 12, the feeding element 13, the feed point 14, and the short circuiting element 15 are arranged on a first surface of the substrate 20. The coupling element 11, the feeding element 13, the feed point 14, and the short circuiting element 15 can each be realized by a wiring pattern of metal. The ground plane 12 can be realized by a plate ground layer. A communication module electrically connected to the coupler 1 may further be provided on the substrate 20. The substrate 20 may be a printed circuit board (PCB).

The communication module performs close proximity wireless transfer with other devices via the coupler 1.

Figure 4:
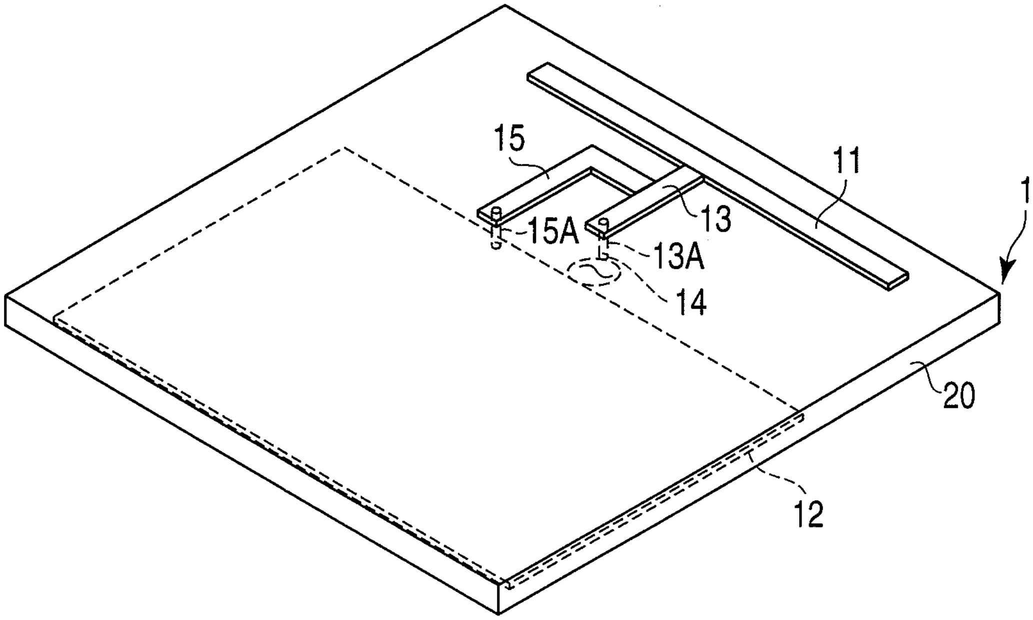
FIG. 4 is an exemplary perspective view illustrating another example of the mounting structure of the coupler according to the embodiment.

As shown in FIG. 4, one of the coupling element 11 and the ground plane 12 may be arranged on the first surface of the substrate 20 and the other of the coupling element 11 and the ground plane 12 may be arranged on a second surface (rear side) of the substrate 20. In FIG. 4, the coupling element 11, the feeding element 13, and the short circuiting element 15 are arranged in a first area on the first surface of the substrate 20. On the other hand, the ground plane 12 is arranged in a third area on the second surface (rear side) of the substrate 20. The third area is an area that is not opposite to the first area on the first surface.

In the flat coupler structure in FIG. 4, the coupling element 11, the feeding element 13, and the short circuiting element 15 are not opposite to the ground plane 12. Thus, even if a thin substrate is used as the substrate 20, energy losses of the coupler 1 can be prevented from increasing. The reason therefor is as follows.

Coupler characteristics are affected by the distance between the coupling element and the ground plane. If the distance between the coupling element and the ground plane is too close, a portion of electromagnetic field generated by the coupling element is more likely to flow into the ground plane due to coupling between the coupling element and the ground plane. Accordingly, energy losses are generated, weakening electromagnetic coupling between couplers. If the distance between the coupling element and the ground plane is set long, coupling between the coupling element and the ground plane can be avoided. However, it is necessary to use a thick substrate to increase the distance between the coupling element and the ground plane. The adoption of a thick substrate could cause an increase in height of the coupler. In the present embodiment, the coupling element 11 is not opposite to the ground plane 12 and thus, an adequate distance can be ensured between the coupling element 11 and the ground plane 12. Therefore, even if a thin substrate is used as the substrate 20, energy losses of the coupler 1 can be prevented from increasing.

The feed point 14 may be arranged on the second surface (rear side) of the substrate 20. In this case, the feeding element 13 may be connected to the feed point 14 via a through-hole 13A in the substrate 20. Also, the short circuiting element 15 may be connected to the ground plane 12 via a through-hole 15A in the substrate 20.

Incidentally, only a portion of each of the feeding element 13 and the short circuiting element 15 may be arranged on the first surface of the substrate 20, and remnant portions thereof may be arranged on the second surface of the substrate 20 so that both portions of the feeding element 13 and the short circuiting element 15 are connected respectively via through-holes therebetween.

Also in the structure in FIG. 4, a communication module may further be provided on the substrate 20.

Next, some other configuration examples of the coupler 1 in the present embodiment will be described with reference to FIGS. 5 to 10.

Figure 5:
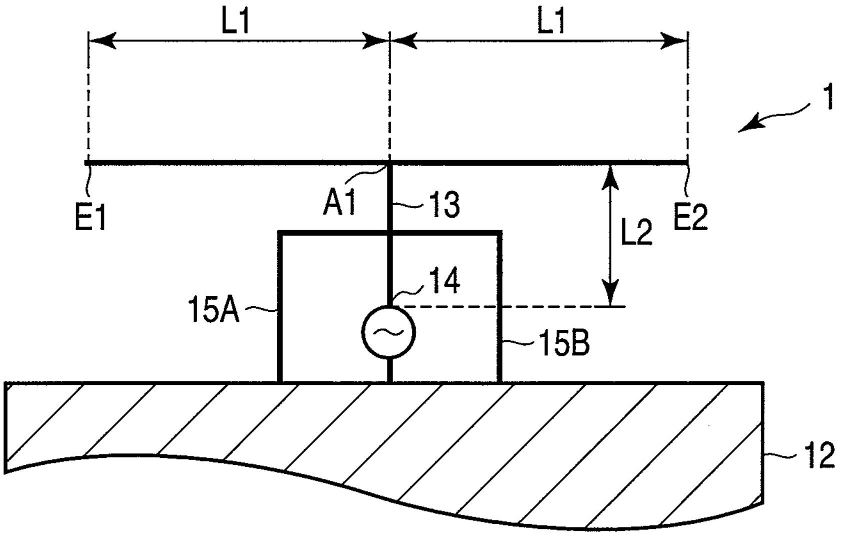
FIG. 5 is an exemplary view illustrating another configuration example of the coupler according to the embodiment.

The coupler 1 shown in FIG. 5 is different from the configuration in FIG. 1 in that two short circuiting elements 15A, 15B are provided and is otherwise the same as the configuration in FIG. 1. The two short circuiting elements 15A, 15B are provided on both sides of the feeding element 13. The short circuiting element 15A connects the feeding element 13 and the ground plane 12. More specifically, one end of the short circuiting element 15A is arranged (connected) between one end and the other end of the feeding element 13 and the other end of the short circuiting element 15A is connected to the ground plane 12. Similarly, the short circuiting element 15B connects the feeding element 13 and the ground plane 12. More specifically, one end of the short circuiting element 15B is arranged (connected) between one end and the other end of the feeding element 13 and the other end of the short circuiting element 15B is connected to the ground plane 12.

In the coupler 1 shown in FIG. 5, the short circuiting elements 15A, 15B are provided on both sides of the feeding element 13 and so that the current distribution can be made more symmetric than the configuration in FIG. 1.

Figure 6:
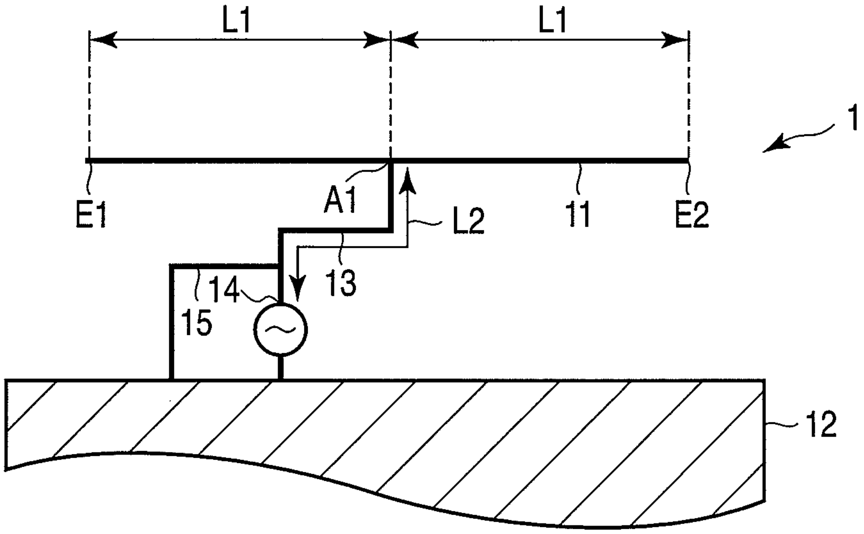
FIG. 6 is an exemplary view illustrating still another configuration example of the coupler according to the embodiment.

In the coupler 1 shown in FIG. 6, instead of immediately below the intermediate portion A1, the feed point 14 is provided in a position (offset position) obtained after an offset being added to the position immediately below the intermediate portion A1. Thus, if a structure of the feed point offset in which the position of the feed point 14 is shifted is adopted, the same effect as that of the configuration in FIG. 1 can be obtained.

Figure 7:
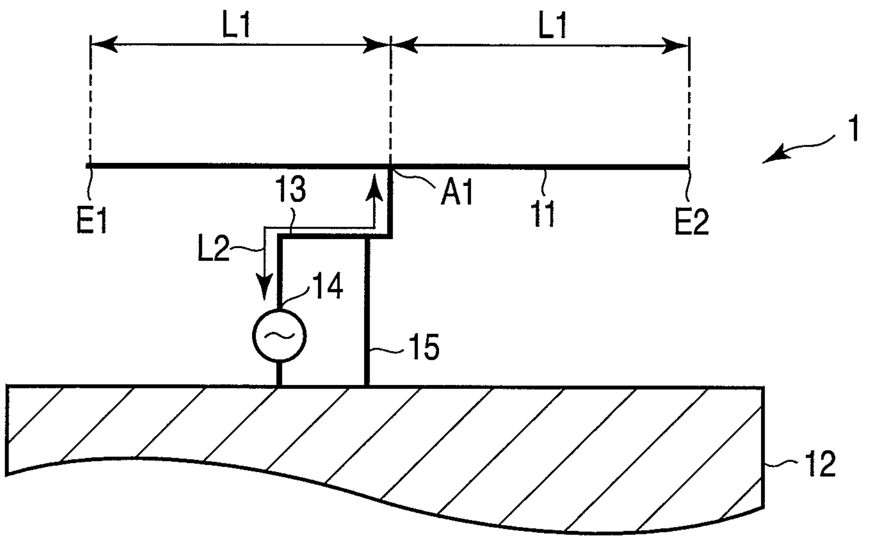
FIG. 7 is an exemplary view illustrating still another configuration example of the coupler according to the embodiment.

The configuration example in FIG. 7 is also an example of offsetting the position of the feed point 14. In this coupler 1, the positional relationship of the feeding element 13 and the short circuiting element 15 is opposite to that of the configuration in FIG. 1.

Figure 8:
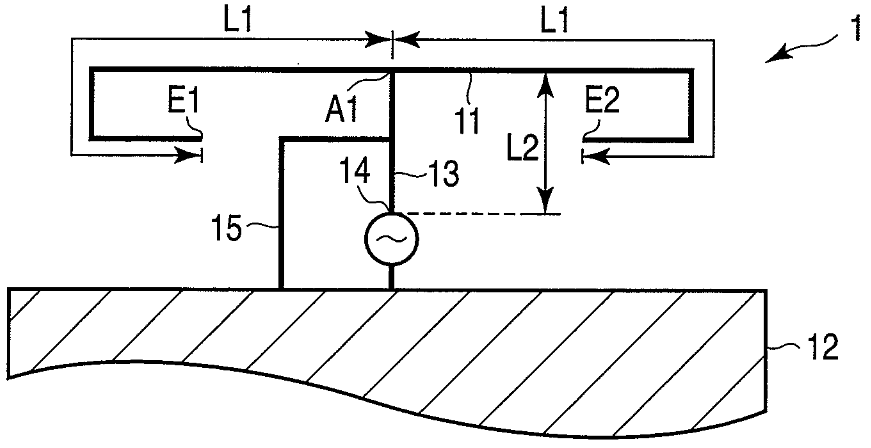
FIG. 8 is an exemplary view illustrating still another configuration example of the coupler according to the embodiment.

In the coupler 1 shown in FIG. 8, both ends of the coupling element 11 are bent downward. With this configuration, the coupling element 11 can be set to an appropriate length even if the width of the substrate 20 is narrow.

Figure 9:
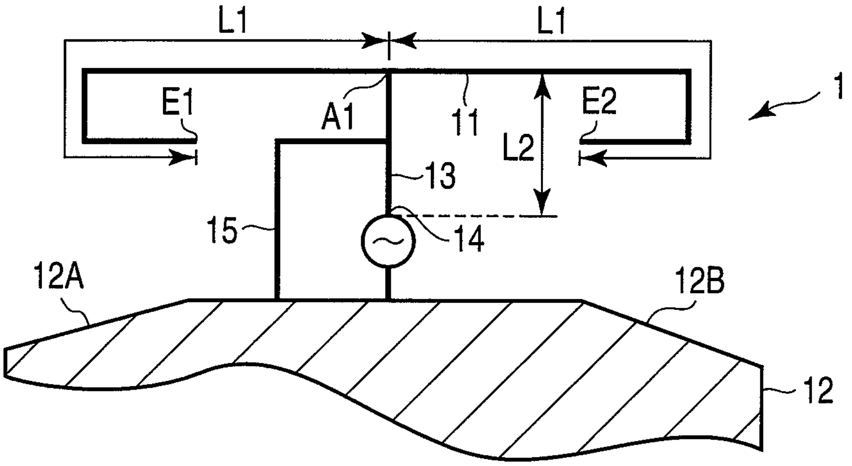
FIG. 9 is an exemplary view illustrating still another configuration example of the coupler according to the embodiment.

In the coupler 1 shown in FIG. 9, both ends of the coupling element 11 are bent downward. Further, upper ends on both sides of the ground plane 12 are cut off. Accordingly, tapers 12A, 12B are provided on upper ends on both sides of the ground plane 12. With this configuration, an adequate distance can be ensured between the coupling element 11 and the ground plane 12.

Figure 10:
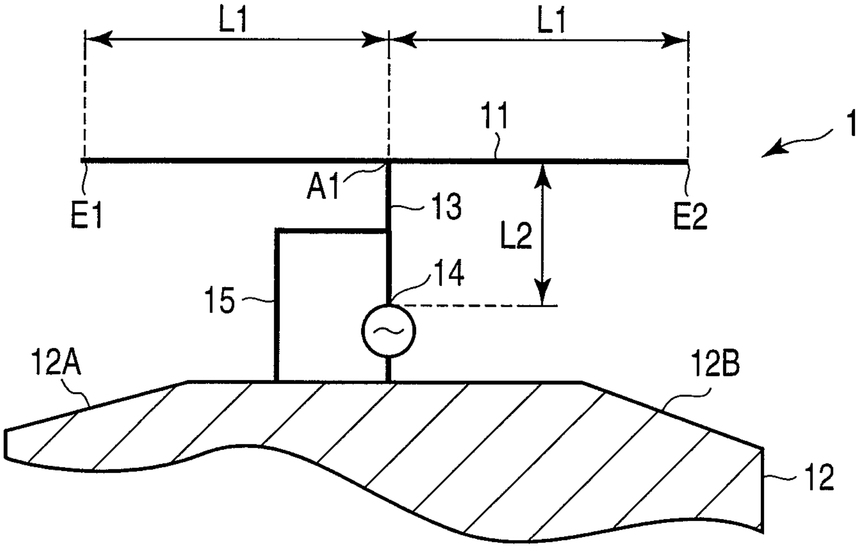
FIG. 10 is an exemplary view illustrating still another configuration example of the coupler according to the embodiment.

FIG. 10 shows an example in which a configuration that cuts off upper ends on both sides of the ground plane 12 is applied to the coupler 1 in FIG. 1. The configuration that cuts off upper ends on both sides of the ground plane 12 can also be applies to the configurations in FIGS. 5, 6, and 7.

Figure 11:
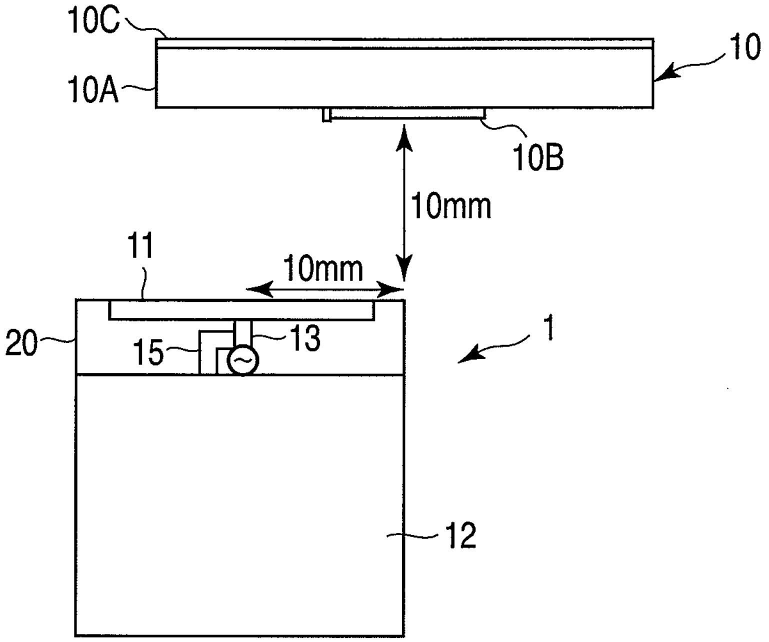
FIG. 11 is an exemplary view illustrating parameters used for measurement of characteristics of the coupler according to the embodiment.
Figure 12:
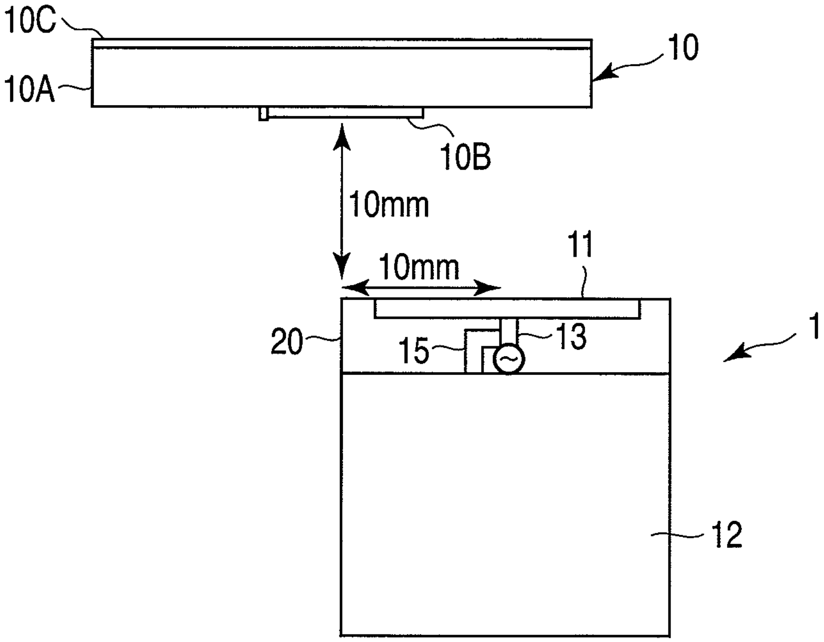
FIG. 12 is an exemplary view illustrating parameters used for measurement of characteristics of the coupler according to the embodiment.
Figure 13:
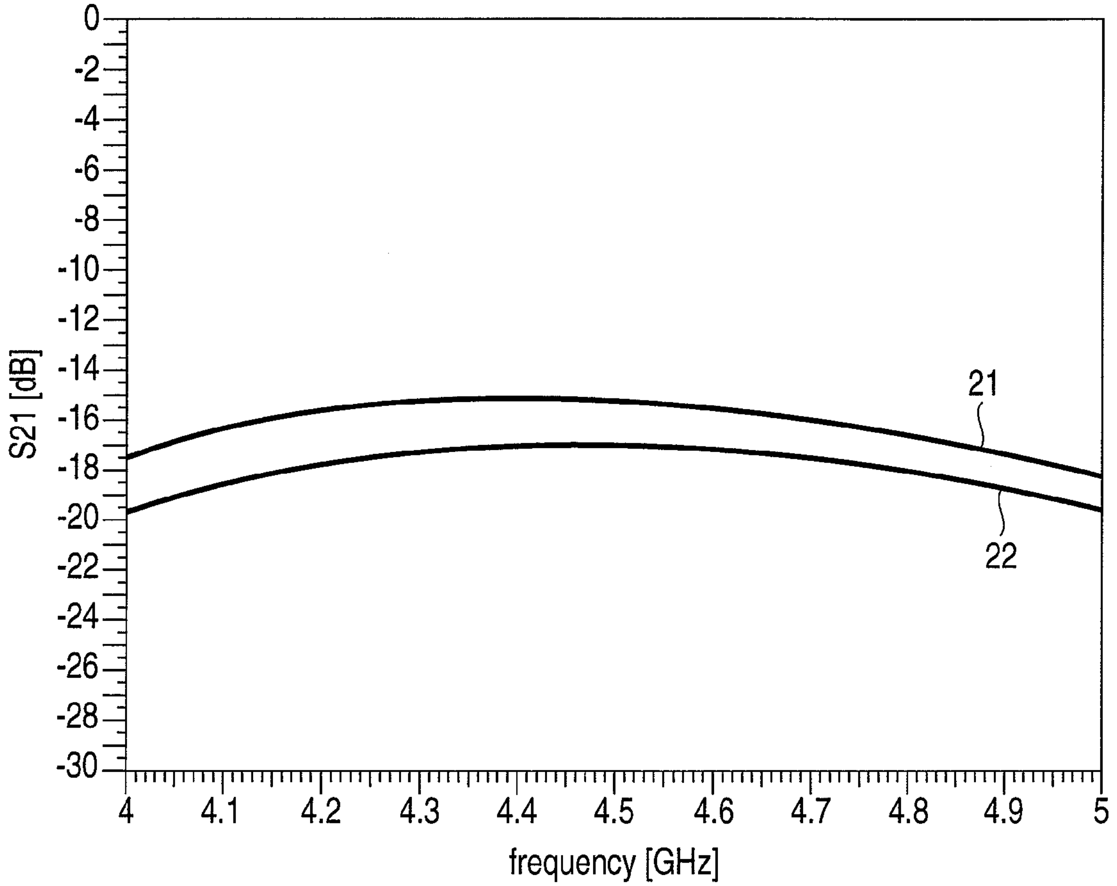
FIG. 13 is an exemplary view illustrating characteristics of the coupler according to the embodiment.

Next, results of characteristics measurement of the coupler 1 will be described with reference to FIGS. 11, 12, and 13. FIGS. 11 and 12 show measurement conditions. FIG. 13 shows characteristics (curve 21) of the coupler 1 under measurement conditions in FIG. 11 and characteristics (curve 22) of the coupler 1 under measurement conditions in FIG. 12. The horizontal axis represents the frequency and the vertical axis represents the transmission coefficient (S21 [dB]) in FIG. 13.

Measurement conditions are as follows:

In FIG. 11, the coupling element of a reference coupler 10 is shifted in the right direction by 10 mm relative to the coupling element of the coupler 1 and also the offset distance between couplers in the vertical direction is set to 10 mm. An ordinary coupler widely known in the field may be used as the reference coupler 10. In the example in FIG. 11, the reference coupler 10 comprises a substrate 10A, a coupling element 10B, and a ground plane 10C.

In FIG. 12, the coupling element of the reference coupler 10 is shifted in the left direction by 10 mm relative to the coupling element of the coupler 1 and also the offset distance between couplers in the vertical direction is set to 10 mm.

It is understood from FIG. 13 that regardless of whether the position of the reference coupler 10 is shifted in the right direction or left direction, adequate coupler characteristics are obtained.

Figure 14:
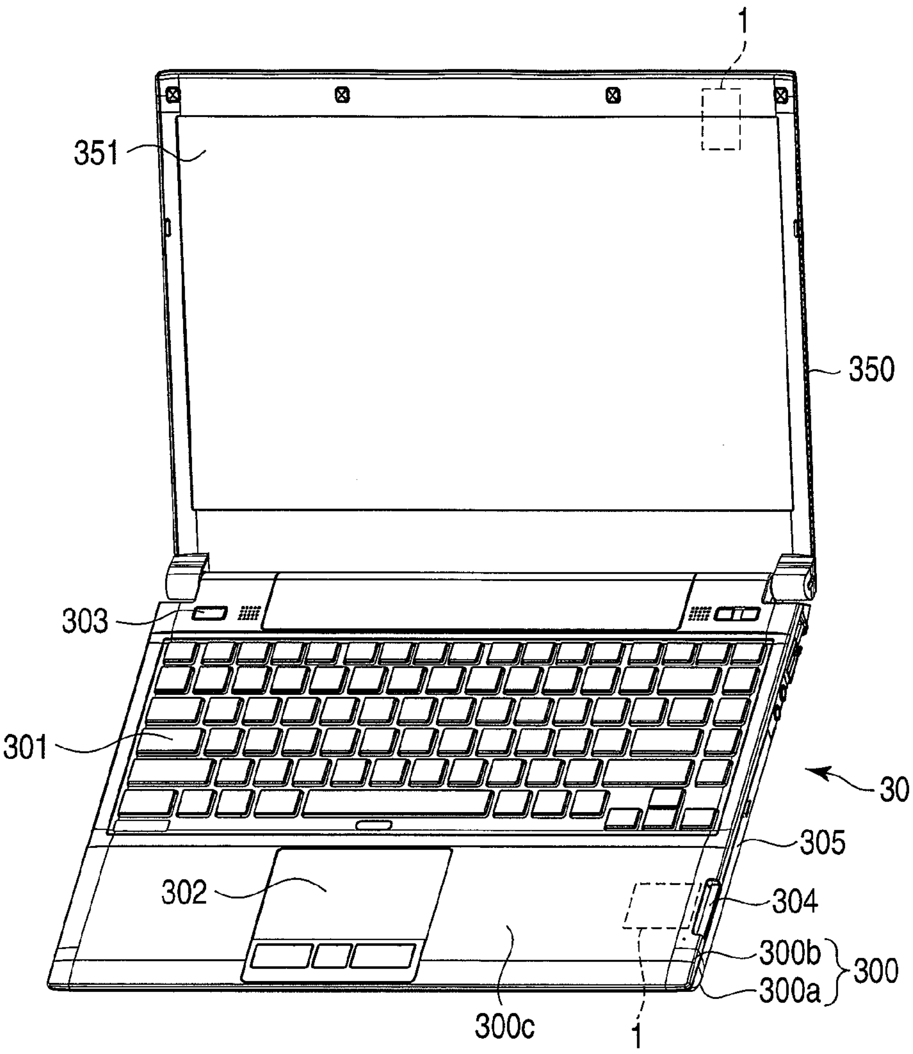
FIG. 14 is an exemplary perspective view illustrating an appearance of an electronic apparatus in which the coupler according to the embodiment is mounted.

FIG. 14 is a perspective view showing an appearance of an electronic apparatus in which the coupler 1 is mounted. The electronic apparatus is realized as an information processing apparatus, for example, as a battery-powered notebook portable personal computer 30.

The computer 30 comprises a main body 300 and a display unit 350. The display unit 350 is freely rotatably mounted on the main body 300. The display unit 350 rotates between an open position at which the upper surface of the main body 300 is exposed and a closed position at which the upper surface of the main body 300 is covered. An LCD (liquid crystal display) 351 is provided inside a housing of the display unit 350.

Figure 15:
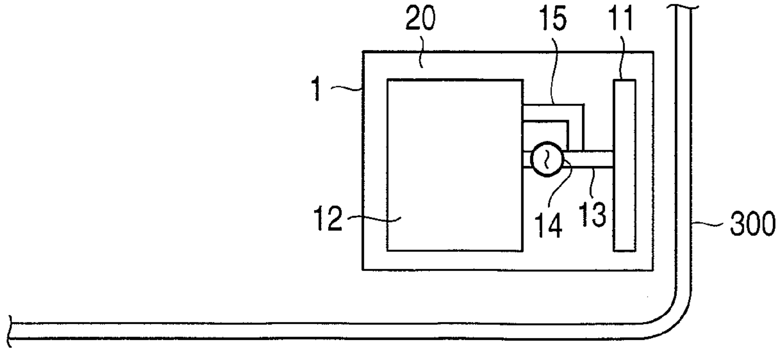
FIG. 15 is an exemplary view illustrating the arrangement of the coupler in the electronic apparatus shown in FIG. 14.

The main body 300 has a thin box-shaped housing. The housing of the main body 300 includes a lower case 300*a* and a top cover 300*b* fitted into the lower case 300*a*. A keyboard 301, a touch pad 302, and a power switch 303 are arranged on the upper surface of the main body 300. Also, a card slot 304 is provided on an outer wall, for example, a right-side wall of the housing of the main body 300. In the example in FIG. 14, the card slot 304 is provided above a storage space for an optical disk drive 305. The coupler 1 is provided inside the housing of the main body 300. As shown in FIG. 15, the coupler 1 is provided in such a way that, for example, the coupling element 11 on the substrate 20 is opposite to the top cover 300*b* and also opposite to the outer wall of the housing of the main body 300. That is, the substrate 20 of the coupler 1 is arranged inside the housing of the main body 300 in such an orientation that the first surface of the substrate 20 is opposite to the top cover 300*b* and also the first area of the substrate 20 on which the coupling element 11 is arranged is closer to the outer wall (for example, the right-side wall) of the housing of the main body 300 than the second area on which the ground plane 12 is arranged. Therefore, a portion of the right-side wall and a portion of a palm rest area 300*c* of the top cover 300*b* each function as a communication surface.

Incidentally, the coupler 1 may be provided inside the housing of the display unit 350.

Figure 16:
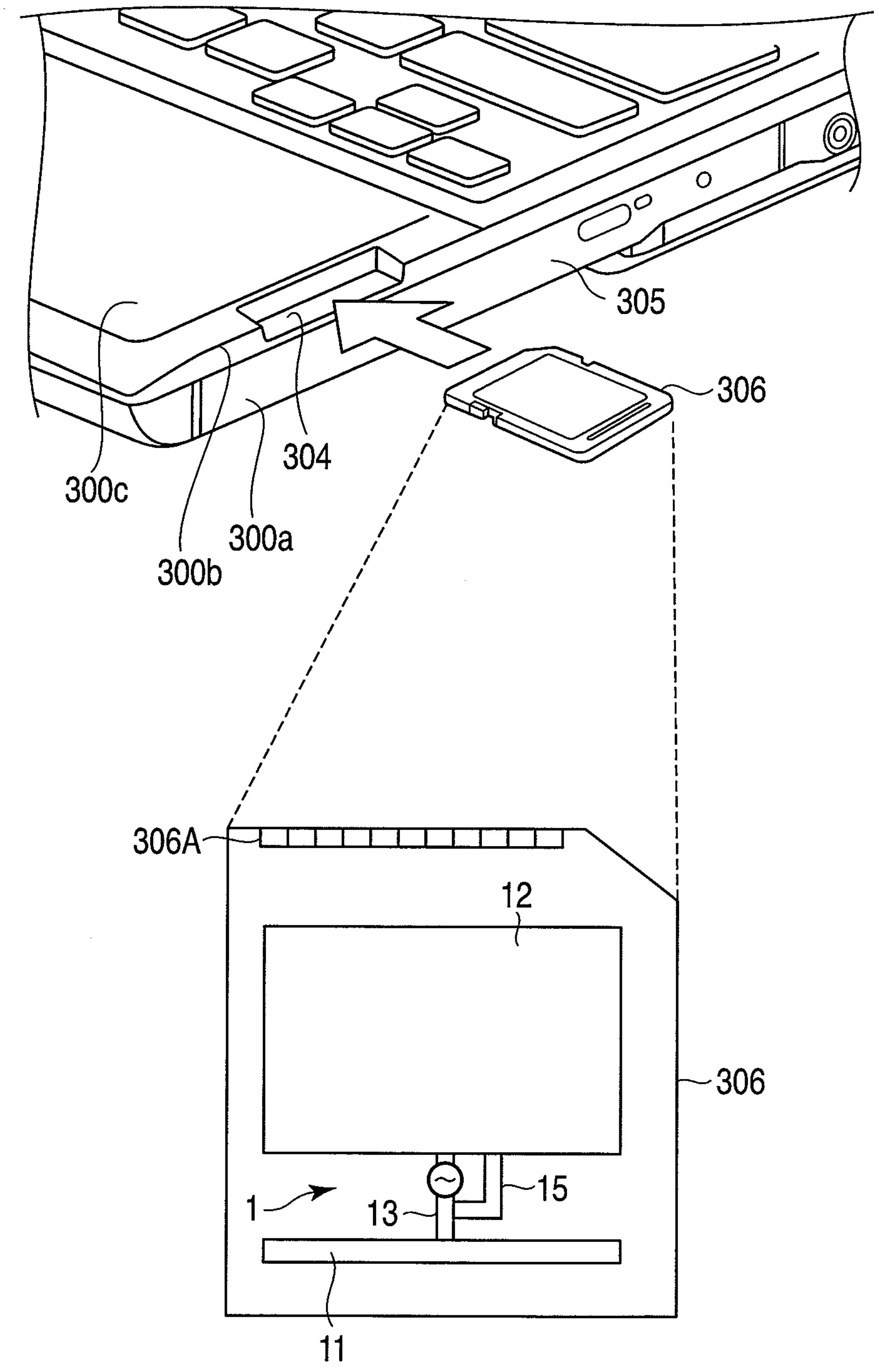
FIG. 16 is an exemplary view illustrating how a card including the coupler according to the embodiment is inserted into a card slot of the electronic apparatus in FIG. 14.

As shown in FIG. 16, the coupler 1 may be provided inside a card device (for example, an SD card) 306 freely removably inserted into the card slot 304. In this case, a connector 306A to interface with a host is provided at an end of the card device 306. The coupler 1 is arranged in the card device 306 in such a way that the coupling element 11 is positioned on the side of the other end of the card device 306. The coupler 1 has, as described above, high impedance and thus, even if the coupler 1 is realized as the card device 306, an influence of coupling to peripheral components in the main body 300 can be reduced.

Figure 17:
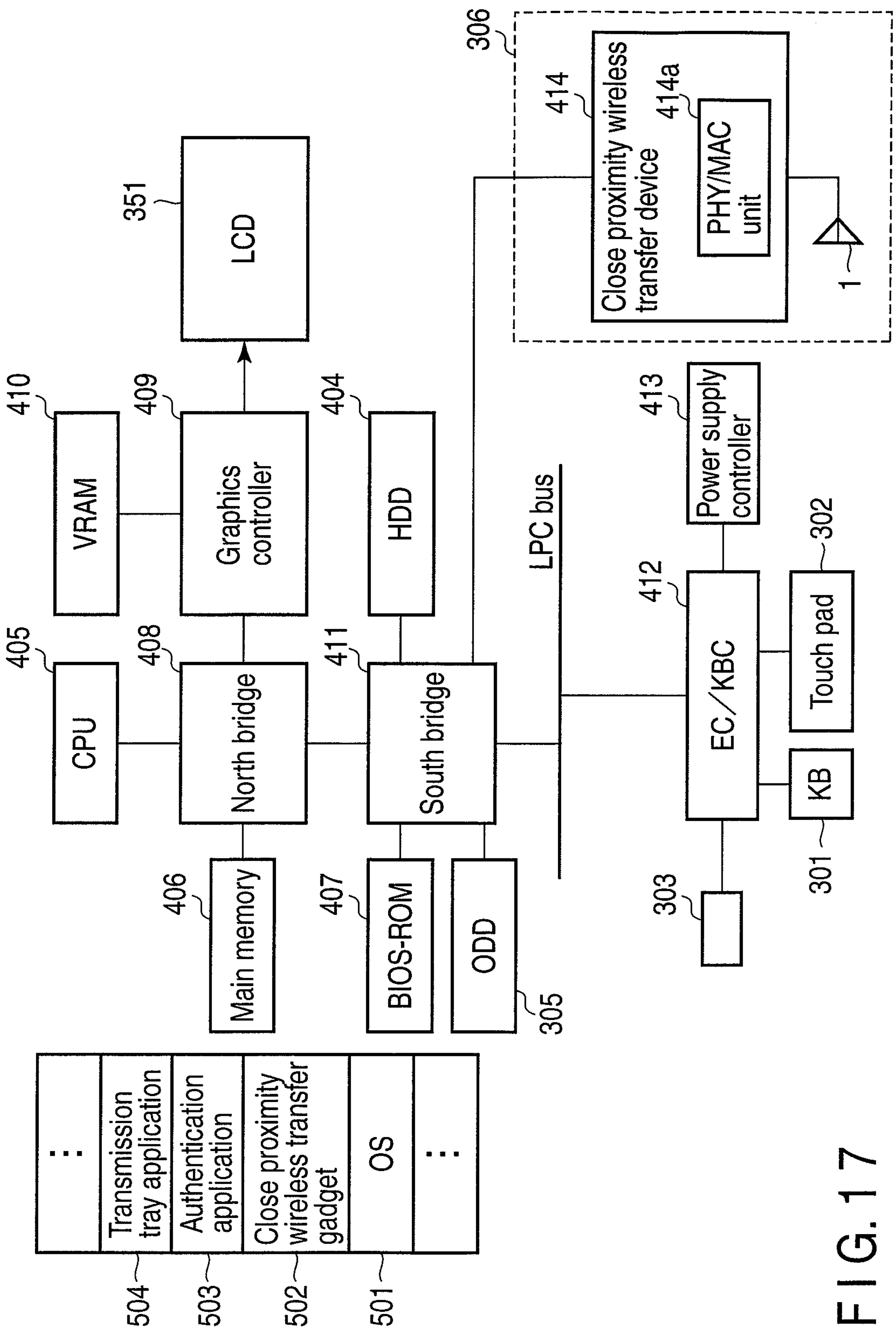
FIG. 17 is an exemplary block diagram illustrating a system configuration of the electronic apparatus shown in FIG. 14.

FIG. 17 is a block diagram showing the system configuration of the computer 30.

In addition to the coupler 1, the keyboard 301, the touch pad 302, the power switch 303, the optical disk drive (ODD) 305, and the LCD 351, the computer 30 comprises a hard disk drive (HDD) 404, a CPU 405, a main memory 406, a BIOS (basic input/output system)-ROM 407, a north bridge 408, a graphics controller 409, a video memory (VRAM) 410, a south bridge 411, an embedded controller/keyboard controller IC (EC/KBC) 412, a power supply controller 413, and a close proximity wireless transfer device 414.

The hard disk drive 404 stores an operating system (OS) and various application programs. The CPU 405 is a processor to control the operation of the computer 30 and executes various programs loaded from the hard disk drive 404 into the main memory 406. Programs executed by the CPU 405 include an operating system 501, a close proximity wireless transfer gadget application program 502, an authentication application program 503, and a transmission tray application program 504. The CPU 405 also executes a BIOS program stored in the BIOS-ROM 407 to control hardware.

The north bridge 408 connects a local bus of the CPU 405 and the south bridge 411. The north bridge 408 incorporates a memory controller that controls access of the main memory 406. The north bridge 408 has a function to perform communication with the graphics controller 409 via an AGP bus or the like. The graphics controller 409 controls the LCD 351. The graphics controller 409 generates, from display data stored in the video memory 410, a video signal representing a display image displayed on the LCD 351. The display data is written into the video memory 410 under control of the CPU 405.

The south bridge 411 controls devices on an LPC bus. The south bridge 411 incorporates an ATA controller to control the hard disk drive 404. Further, the south bridge 411 has a function to control access to the BIOS-ROM 407. The embedded controller/keyboard controller IC (EC/KBC) 412 is a one-chip microcomputer in which an embedded controller and a keyboard controller are integrated. The embedded controller controls the power supply controller 413 so that the computer 30 is powered on or powered off in accordance with the operation of the power switch 303 by the user. The keyboard controller controls the keyboard 301 and the touch pad 302. The power supply controller 413 controls the operation of a power supply apparatus (not shown). The power supply apparatus generates operating power of each unit of the computer 30.

The close proximity wireless transfer device 414 is a communication module to perform close proximity wireless transfer. The close proximity wireless transfer device 414 comprises a PHY/MAC unit 414*a*. The PHY/MAC unit 414*a* operates under control of the CPU 405. The PHY/MAC unit 414*a* wirelessly transmits and receives signals via the coupler 1. The close proximity wireless transfer device 414 is arranged in the housing of the main body 300.

Data is transferred between the close proximity wireless transfer device 414 and the south bridge 411 via, for example, a PCI (peripheral component interconnect) bus. Instead of PCI, PCI Express may be used.

As described above, the close proximity wireless transfer device 414 and the coupler 1 may be incorporated in the card device 306.

The computer 30 is described here as an example of the electronic apparatus mounting the coupler 1, but the electronic apparatus may be, for example, a TV. The coupler 1 is arranged in the housing of the TV. If the TV has a card slot, a card device incorporating the coupler 1 or a card device incorporating both the coupler 1 and the close proximity wireless transfer device 414 may be inserted into the card slot.

Next, some configuration examples of the card device 306 will be described with reference to FIGS. 18 to 21.

Figure 18:
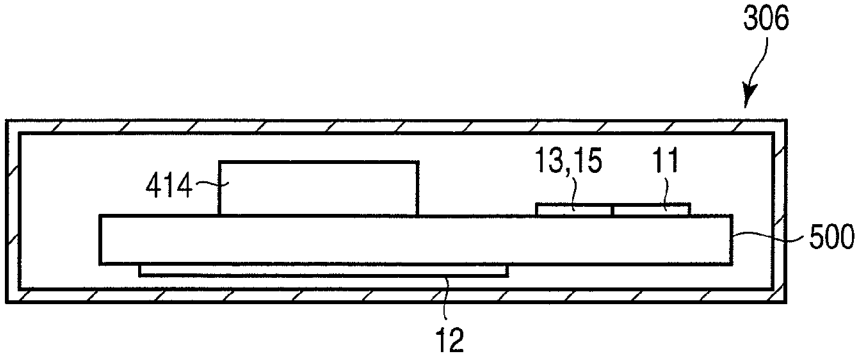
FIG. 18 is an exemplary view illustrating a structure example of the card including the coupler according to the embodiment.

FIG. 18 shows a first configuration example of the card device 306. A substrate (dielectric substrate) 500 such as a printed circuit board is provided in the housing of the card device 306. The coupling element 11, the feeding element 13, and the short circuiting element 15 described above are arranged in the first area on the first surface of the substrate 500. The close proximity wireless transfer device 414 is provided in the second area on the first surface of the substrate 500. In addition to the close proximity wireless transfer device 414, a nonvolatile memory may be provided in the second area. A ground layer as the ground plane 12 is arranged in the third area on the second surface (rear side) of the substrate 500. The third area on the second surface is not opposite to the first area on the first surface. The feed point 14 may be provided on the first surface or second surface. The short circuiting element 15 and the ground plane 12 are connected via a through-hole inside the substrate 500. Some ground pins of the close proximity wireless transfer device 414 are connected to the ground plane 12 via through-holes inside the substrate 500.

Figure 19:
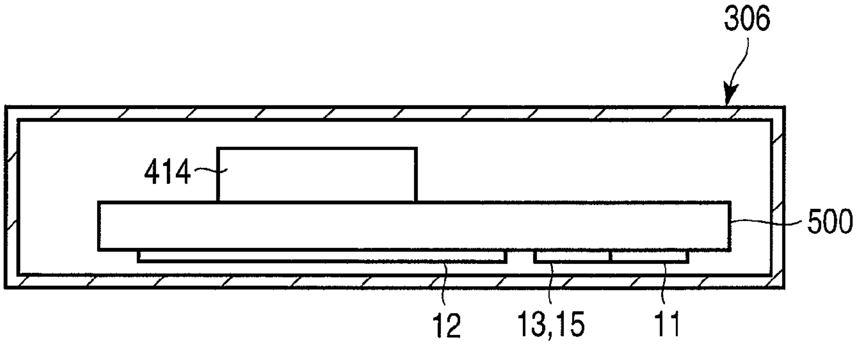
FIG. 19 is an exemplary view illustrating another structure example of the card including the coupler according to the embodiment.

FIG. 19 shows a second configuration example of the card device 306. In FIG. 19, the coupling element 11, the feeding element 13, and the short circuiting element 15 are arranged on the second surface (rear side) of the substrate 500.

Figure 20:
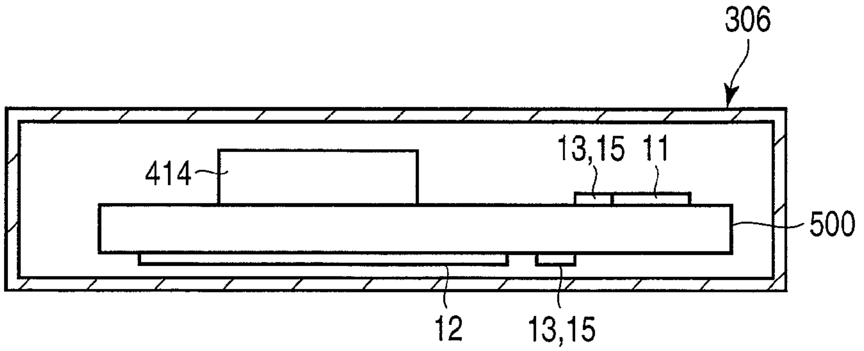
FIG. 20 is an exemplary view illustrating still another structure example of the card including the coupler according to the embodiment.

FIG. 20 shows a third configuration example of the card device 306. In FIG. 20, when compared with the configuration in FIG. 18, the only difference is that a portion of each the feeding element 13 and the short circuiting element 15 is provided in the first area on the first surface of the substrate 500 and the remnant portion of each the feeding element 13 and the short circuiting element 15 is provided on the second surface of the substrate 500.

Figure 21:
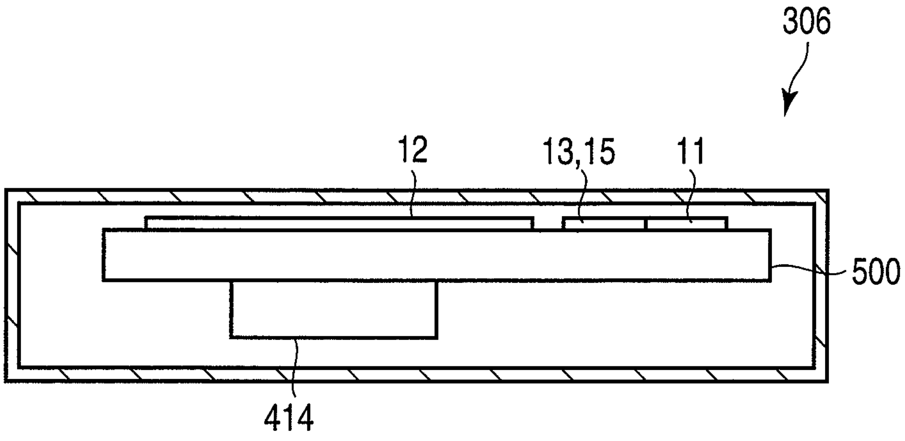
FIG. 21 is an exemplary view illustrating still another structure example of the card including the coupler according to the embodiment.

FIG. 21 shows the fourth configuration example of the card device 306. In FIG. 21, the coupling element 11, the feeding element 13, and the short circuiting element 15 described above are arranged in the first area on the first surface of the substrate 500. The ground plane 12 is arranged in the second area on the first surface of the substrate 500. The close proximity wireless transfer device 414 is arranged in the third area opposite to the second area on the second surface (rear side) of the substrate 500.

In the present embodiment, as described above, one end of the feeding element 13 is connected to the intermediate portion A1 of the coupling element 11, one end of the short circuiting element 15 is arranged (connected) between one end and the other end of the feeding element 13, and the other end of the short circuiting element 15 is connected to the ground plane 12 and thus, a high impedance of the coupler 1 can be realized without preventing currents of the same amount of current and in mutually opposite directions from being passed through the coupling element 11, that is, without weakening the tolerance for position shifts of the coupler 1. Therefore, both of the reduction of influence due to peripheral components and a sufficient tolerance for position shifts can easily be realized.

Figure 22:
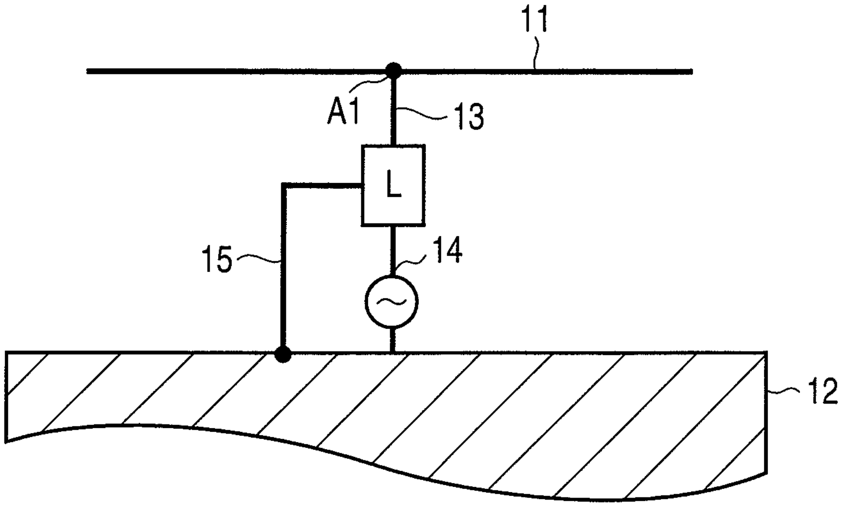
FIG. 22 is an exemplary view illustrating still another configuration example of the coupler according to the embodiment.
Figure 23:
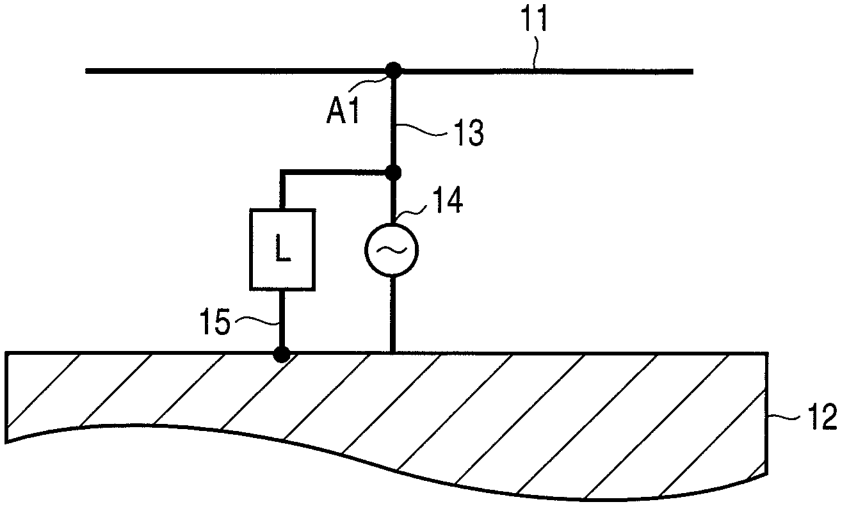
FIG. 23 is an exemplary view illustrating still another configuration example of the coupler according to the embodiment.
Figure 24:
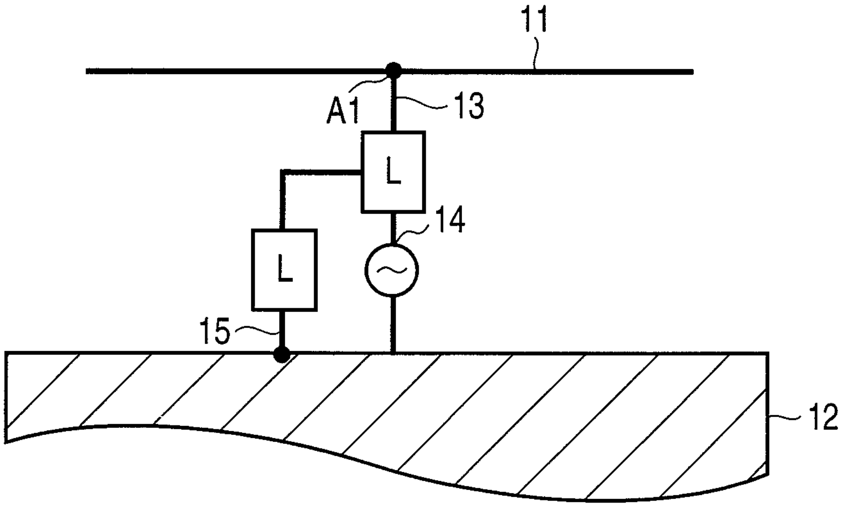
FIG. 24 is an exemplary view illustrating still another configuration example of the coupler according to the embodiment.

The resonance frequency of the coupler 1 is determined based on the length of L1+L2 described above, but an element such as an inductor may be added to between the coupling element 11 and the feed point 14 in FIG. 1 to adjust the resonance frequency of the coupler 1. FIG. 22 shows an example in which an inductor L is inserted between the coupling element 11 and the feed point 14 in series as a resonance frequency adjustment element. In FIG. 22, the inductor L is inserted into the feeding element 13. It is needless to say that the whole feeding element 13 may be constituted of the inductor L. FIG. 23 shows an example in which the inductor L is inserted into the short circuiting element 15 in series. FIG. 24 shows an example in which the inductor L is inserted between the coupling element 11 and the feed point 14, that is, into the feeding element 13 in series and also the inductor L is inserted into the short circuiting element 15 in series.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A device capable of being connected to an electronic apparatus, the device comprising a coupler for wireless transfer, the coupler comprising:

a coupling element;

a feeding element connecting a feed point and an intermediate point of the coupling element, the feeding element comprising a first end connected to the intermediate point of the coupling element and a second end connected to the feed point;

a first short circuiting element connecting the feeding element and a ground plane; and a second short circuiting element connecting the feeding element and the ground plane, wherein the second short circuiting element is on an opposite side of the first short circuiting element with respect to the feeding element, and both of the first short circuiting element and the second short circuiting element are directly connected to an intermediate point of the feeding element between the first end and the second end, so that current distribution in the coupling element is substantially symmetrical with respect to the intermediate point of the coupling element, wherein the device comprises a housing comprising a first side and a second side opposite to the first side, wherein a connector configured to interface with the electronic apparatus is arranged at the first side, and wherein the coupling element is arranged at the second side.

2. The device of claim 1, wherein the coupling element comprises a first open end and a second open end, an electric length from the feed point to each of the first open end and the second open end is ¼ of a wavelength corresponding to a center frequency used for the wireless transfer.

3. The device of claim 1, wherein the coupler further comprises a substrate, wherein the coupling element is in a first area on a first surface of the substrate, and wherein the ground plane is in a second area on the first surface of the substrate or in a third area on a second surface of the substrate, the third area on the second surface being distinct from the first area of the first surface when the third area of the second surface and the first area of the first surface are projected onto a single plane.

4. A device capable of being connected to an electronic apparatus, the device comprising a coupler for wireless transfer, the coupler comprising:

a substrate;

a coupling element on the substrate;

a feeding element on the substrate connecting an intermediate point of the coupling element and a feed point, the feeding element comprising a first end connected to the intermediate point of the coupling element and a second end connected to the feed point;

a first short circuiting element on the substrate connecting the feeding element and a ground plane; and a second short circuiting element on the substrate connecting the feeding element and a ground plane, wherein the second short circuiting element is on an opposite side of the first short circuiting element with respect to the feeding element, and both of the first short circuiting element and the second short circuiting element are directly connected to an intermediate s point of the feeding element between the first end and the second end, so that current distribution in the coupling element is substantially symmetrical with respect to the intermediate point of the coupling element, wherein the device comprises a housing comprising a first side and a second side opposite to the first side, wherein a connector configured to interface with the electronic apparatus is arranged at the first side, and wherein the coupling element is arranged at the second side.

5. The device of claim 4, wherein the coupling element comprises a first open end and a second open end, an electric length from the feed point to each of the first open end and the second open end is ¼ of a wavelength corresponding to a center frequency used for the wireless transfer.

6. The device of claim 4, further comprising a communication module electrically connected to the coupler, wherein the communication module is provided on the substrate.

7. The device of claim 1, wherein the coupling element comprises a first open end and a second open end, the feeding element connecting the feed point and the intermediate point of the coupling element between the first open end and the second open end.

8. The device of claim 4, wherein the coupling element comprises a first open end and a second open end, the feeding element connecting the feed point and the intermediate point of the coupling element between the first open end and the second open end.

9. A device capable of being connected to an electronic apparatus, the device comprising a coupler for wireless transfer, the coupler comprising:

a coupling element;

a feeding element connecting a feed point and an intermediate point of the coupling element, the feeding element comprising a first end connected to the intermediate point of the coupling element and a second end connected to the feed point;

a first short circuiting element connecting the feeding element and a ground plane; and a second short circuiting element connecting the feeding element and the ground plane, wherein the second short circuiting element is on an opposite side of the first short circuiting element with respect to the feeding element, and both of the first short circuiting element and the second short circuiting element are directly connected to an intermediate point of the feeding element between the first end and the second end, so that current distribution in the coupling element is substantially symmetrical with respect to the intermediate point of the coupling element.

10. The device of claim 9, wherein the device comprises a housing comprising a first side and a second side opposite to the first side, wherein a connector configured to interface with the electronic apparatus is arranged at the first side, and wherein the coupling element is arranged at the second side.

11. The device of claim 9, wherein the coupling element comprises a first open end and a second open end, an electric length from the feed point to each of the first open end and the second open end is ¼ of a wavelength corresponding to a center frequency used for the wireless transfer.

12. The device of claim 9, wherein the coupling element comprises a first open end and a second open end, the feeding element connecting the feed point and the intermediate point of the coupling element between the first open end and the second open end.

13. The device of claim 1, wherein the first short circuiting element comprises a third end directly connected to the intermediate point of the feeding element and a fourth end connected to a first short circuiting point on the ground plane, and the second short circuiting element comprises a fifth end directly connected to the intermediate point of the feeding element and a sixth end connected to a second short circuiting point on the ground plane.

14. The device of claim 9, wherein the first short circuiting element comprises a third end directly connected to the intermediate point of the feeding element and a fourth end connected to a first short circuiting point on the ground plane, and the second short circuiting element comprises a fifth end directly connected to the intermediate point of the feeding element and a sixth end connected to a second short circuiting point on the ground plane.

15. The device of claim 4, wherein the first short circuiting element comprises a third end directly connected to the intermediate point of the feeding element and a fourth end connected to a first short circuiting point on the ground plane, and the second short circuiting element comprises a fifth end directly connected to the intermediate point of the feeding element and a sixth end connected to a second short circuiting point on the ground plane.

* * * * *